United States Patent [19]

Cerroni

[11] 4,153,207
[45] May 8, 1979

[54] PLANT FOR THE CONTINUOUS PRODUCTION OF PAPER-PULP FROM SOLID URBAN WASTE

[76] Inventor: Manlio Cerroni, Via Bruxelles 53, Rome, Italy

[21] Appl. No.: 811,706

[22] Filed: Jun. 30, 1977

Related U.S. Application Data

[60] Continuation-in-part of Ser. No. 624,896, Oct. 22, 1975, abandoned, which is a continuation of Ser. No. 463,768, Apr. 24, 1974, abandoned, which is a division of Ser. No. 358,516, May 9, 1973, Pat. No. 3,891,105.

[30] Foreign Application Priority Data

Feb. 22, 1973 [IT] Italy ............................ 48411 A/73
Apr. 20, 1973 [IT] Italy ............................ 49595 A/73

[51] Int. Cl.² .................................................. B02C 23/36
[52] U.S. Cl. .................................. 241/46.17; 241/79; 241/DIG. 38
[58] Field of Search ......... 241/46.17, 34, 79, DIG. 38

[56] References Cited

U.S. PATENT DOCUMENTS

| | | | |
|---|---|---|---|
| 2,796,006 | 6/1957 | Chaplin | 241/34 |
| 3,021,080 | 2/1962 | Chaplin | 241/46.17 |
| 3,339,851 | 9/1967 | Felton et al. | 241/46.17 |
| 3,549,092 | 12/1970 | Baxter, Jr. | 241/46.17 |

Primary Examiner—Howard N. Goldberg
Attorney, Agent, or Firm—Toren, McGeady and Stanger

[57] ABSTRACT

In the continuous production of paper-pulp from solid urban waste, paper along with polluting elements are charged into a kneader or hydropulper. Water is added and the paper is pulped, however, the polluting elements remain and at least some of them cannot be reduced in size. In the bottom of the pulper there is a grate through which the paper-pulp and small sized elements can be removed. Larger sized elements are retained by the grate and periodically are removed through a second opening into a pipe in which flow is controlled by a cut-off valve. After periodic removal from the pulper, the larger sized elements and paper-pulp removed along with them, are directed into a separator where the paper-pulp and larger elements are separated and collected.

2 Claims, 5 Drawing Figures

PLANT FOR THE CONTINUOUS PRODUCTION OF PAPER-PULP FROM SOLID URBAN WASTE

PRIOR RELATED APPLICATIONS

This is a continuation-in-part of application Ser. No. 624,896, filed Oct. 22, 1975, now abandoned, which application was a continuation of application Ser. No. 463,768, filed Apr. 24, 1974, now abandoned, which in turn, was a divisional application of Ser. No. 358,516, filed on May 9, 1973, which issued into U.S. Pat. No. 3,891,105 on June 24, 1975.

The present invention is directed to a plant for the continuous production of paper-pulp from solid urban waste, and, more particularly, it is directed to the arrangement of a kneader or hydropulper and a separator for removing large-sized polluting elements from the paper-pulp during its continuous production.

As is known, the ever-increasing need for paper has compelled the use of poorer grades of paper products, that is, products containing paper of a low quality level or paper including other elements which tend to affect its quality. Such low quality results from the use of paper recovered from solid urban waste. Various mechanical means are used in such recovery operations.

In the past, the source of recovered paper has been discarded paper, warehouse-wastes and the like and there has not been any particular problem in converting such waste paper into paper-pulp. There is available conventional equipment for the conversion of such waste paper into pulp. Where necessary, it has been possible to modify such equipment without any resulting problems. At the present time, however, with the great quantity of waste paper contained in solid urban waste there has been a need to develop a new system of pulping which allows continuous production without any undue delays. One of the primary problems experienced has been the separation of polluting elements from the paper collected in solid urban wastes. If these deleterious elements cannot be removed they tend to reduce the quality of the paper-pulp produced and also disadvantageously affect the continuous production operation.

In the operation of conventional kneaders, or pulpers, certain materials are not reduced in spite of the pulping action and cannot be removed from the pulper in the normal manner. These elements or materials which are separated with the paper from solid urban wastes include various plastic materials, such as are incorporated in packaging, rags, rugs, leather and similar materials. Since these materials cannot be reduced in the pulping action, they tend to block the pulper after a certain build-up period and it becomes impossible to carry out continuous production of the paper pulp.

In conventional kneaders or pulpers, the paper-pulp and other small-sized material is conducted through a grate to an outlet opening. The discharged material is conducted through centrifugal machines for separating the paper-pulp and other materials. Accordingly, it is known from conventional paper-pulping operations that both paper-pulp and other materials of a small size are removed from the pulper and subsequently separated.

As mentioned above, in the paper processing operations, a number of polluting elements are mixed with the paper charged into the pulper and because of the characteristic of certain of the elements they cannot be reduced in size for discharge through the gate into the normal outlet. As a result, these materials form a mass which cannot pass through the grate to the outlet and, with build-up, tend to interfere with the proper operation of the pulper.

For effective continuous operation of the kneader or pulper, a well established rhythm must be effected. If the polluting mass in the kneader is removed by mechanical means, it is necessary to discontinue the working cycle for a period of time and this, of course, interrupts and interferes with the normal and continuous kneader operation.

During the processing of solid urban waste the waste paper separated contains a considerable amount of polluting elements. These elements can be light or heavy in weight and include plastics, such as polystyrenes, and rags or similar material making up the lighter fraction, and other materials such as stones, fragments of pottery, and the like making up the heavier fraction.

In carrying out the present invention, the waste paper along with foreign or polluting materials, which may have a greater or lesser specific weight than the paper, is charged into the pulper. The pulper is generally the same as conventional apparatus used for the same purpose. Water is added into the pulper and the paper along with the other materials are subjected to a pulping action with the paper being reduced to fibers mixed with the water. While some of the polluting elements may be reduced, others, such as plastics, leathers, rags, stones and the like usually remain in their original shape and size as when charged into the pulper.

As in conventional systems used in the past, the paper-pulp can be removed from the pulper using a pump. In the past it has also been known to provide an enlarged outlet opening from the pulper for discharging may incidental large material which accumulated. Normally, this removal operation was carried out at the end of a working cycle or the end of a working day, and in some instances the discharge operation was effected only after a number of working days. Due to the polluting materials received along with the paper from solid urban wastes, there is the tendency for a rapid build-up of such materials to occur, as compared to the conventional operations of the past, with the result that effective continuous operation cannot be carried out.

In accordance with the present invention, to overcome this problem, the kneader or pulper is provided with a special opening of considerable size, about half a meter on a side, and it is connected to an outlet pipe containing a sash lock-gate valve for regulating flow through the valve. The valve can be operated manually or automatically so that oversized materials can be removed from the kneader which could not otherwise be withdrawn by the usual paper-pulp removing apparatus. As a result, the oversized or larger material along with a certain amount of liquid and paper-pulp are withdrawn from the kneader or pulper periodically during operation so that the paper-pulping can be carried out continuously. The oversized materials along with the water and paper-pulp are conveyed into a separator where the paper-pulp, water and any small-sized foreign or polluting materials are removed through one outlet with the oversized foreign materials being discharged through another outlet.

The various features of novelty which characterize the invention are pointed out with particularity in the claims annexed to and forming a part of this disclosure. For a better understanding of the invention, its operating advantages and specific objects attained by its use, references should be had to the accompanying drawings and descriptive matter in which there are illustrated and described preferred embodiments of the invention.

DETAILED DESCRIPTION OF THE INVENTION

Figure 1:
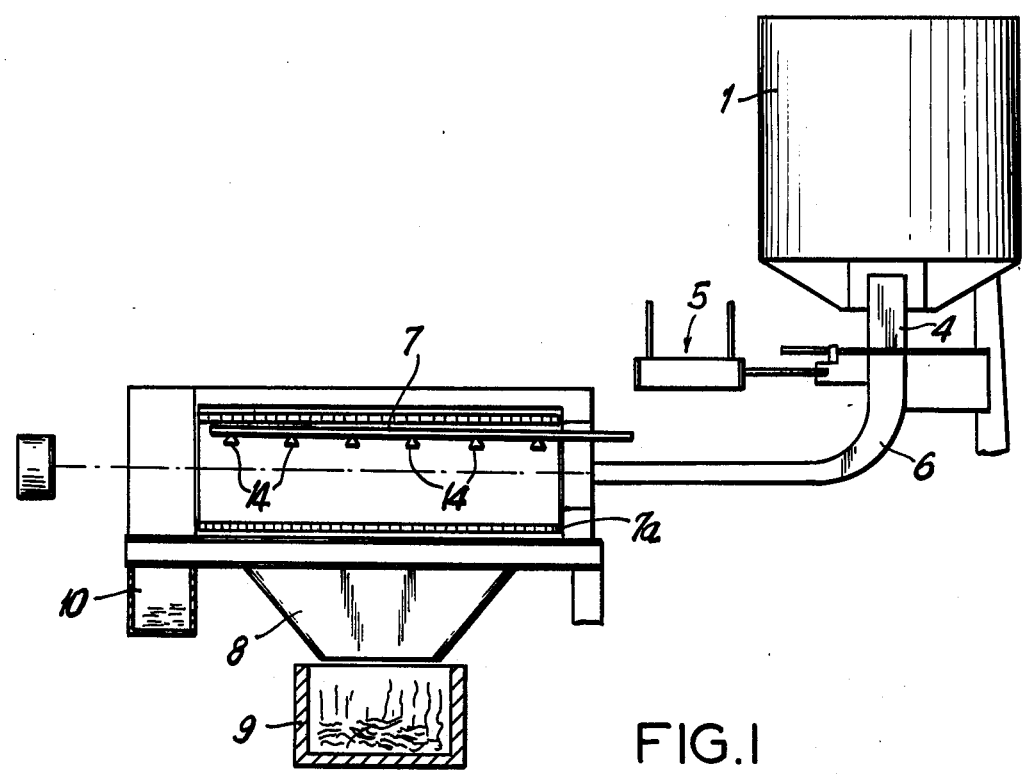
FIG. 1 is a schematic showing of a plant for the continuous production of paper-pulp and embodying the present invention.
Figure 2:
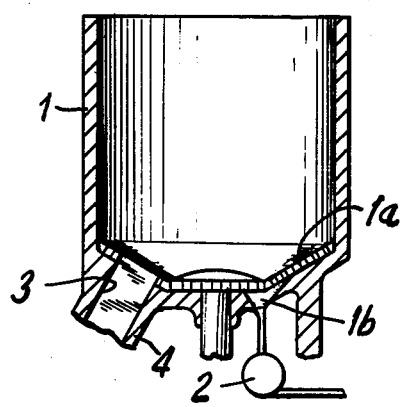
FIG. 2 is a vertical sectional schematic view of the kneader illustrated in FIG. 1.

In FIG. 1, a plant is shown for effecting the continuous production of paper-pulp from paper recovered from solid urban waste. Because of its source, however, in addition to the paper the materials charged into a kneader or hydropulper 1 contain foreign or polluting elements whose specific weight may be greater, equal or less than that of paper and the size of such elements may also be greater or smaller than the size of the paper-pulp to be produced. The pulper 1 is similar to conventional devices of the same type. After water is added into the pulper along with the paper and other materials, the pulping process is commenced and the paper is converted into paper-pulp, that is, the paper fibers mixed with water. In addition, at least certain of the foreign elements contained in the pulper are not reduced in shape or size and tend to form a blocking mass.

After the pulping process has been carried out, paper-pulp is removed from the pulper 1 using a conventional system, that is, a pump 2 connected to an outlet opening 1b in the lower end of the pulper 1 sucks the paper-pulp through the grate 1a located in the bottom of the pulper so that all of the paper that has been pulped and partially converted into paper-pulp, is removed along with any polluting elements of a size capable of passing through the grate. The mixture of the paper-pulp and polluting elements can be processed according to known operations for separating the paper-pulp for subsequent use.

In the past it has been known to provide a pulper 1 with a discharge opening for removing materials incapable of passing through the grate into a tank. The removal operation usually takes place at the end of a pulping run or, preferably, at the end of a working day. With the problems experienced with the foreign or polluting elements removed with the paper from solid urban waste, it is not possible to provide a continuous pulping operation due to the build-up of such materials. Accordingly, in pulper 1 a second outlet opening 3 is provided, open to the space above the grate 1a, and its size is such that it is capable of discharging any foreign elements which cannot pass through the grate. As illustrated in FIG. 1, a pipe 4 is connected to the second opening 3 and a sash lock-gate valve 5 is located in the pipe 4 so that it can be opened and closed during a pulping cycle either manually or automatically. Accordingly, materials incapable of passing through the grate 1a can be periodically removed from the pulper through the second opening 3 and the pipe 4 by opening the valve 5. When the valve is open not only do the oversized materials flow through the pipe, but a certain amount of the paper-pulp and water flows out along with the materials.

The mixture of oversized foreign materials and paper-pulp, removed periodically from the pulper 1, flows through the pipe 4 and the valve 5 into another pipe 6 downstream of the valve and then into a separator 7. A screen 7a is provided within the separator and has openings sized to permit the paper-pulp to be separated from the oversized materials. While the paper-pulp and its water carrier flows through the screen 7a the oversized materials are conveyed from one end of the separator 7 to the other and are deposited in the canal or channel 10.

The paper pulp passing through the screen 7a is conducted through a hopper 8 and collected in box or tank 9 from which it can be removed for subsequent treatment and use. The paper-pulp removed can be returned to the pulper if further processing is required or it can be separated from the foreign materials passing with it through the screen 7a and conveyed to a point of use.

Accordingly, during continuous operation of the pulper, it is possible to remove all oversized foreign or polluting materials which cannot pass through the grate 1a while the pulping action continues. During each of these removal operations, the pulper is cleaned and in condition for continuous operation without the mass of oversized foreign material blocking its proper operation. If the build-up of the oversized foreign material is not withdrawn from the pulper its operation would be blocked and the pulping could not continue. In the past, pulpers have been provided with a discharge opening for removing oversized materials, however, such removal was effected only with the pulper closed down. Use of the opening fully emptied the pulper, permitting it to be completely cleaned. Further, such an opening was used in combination with a pump. Usually, in the known pulpers, after the paper pulp and water had been removed through the normal outlet opening, and the pulper emptied then the special discharge outlet was opened for removing the oversized foreign materials which remain in the bottom of the pulper. The materials were usually dumped out onto the ground or into a special tank. In carrying out such an operation, it was necessary to stop the paper-pulping cycle and, as a result, continuous operation was impossible. However, in the present invention, it is possible to provide a continuous pulping operation with periodic removal of any of the oversized foreign materials which tend to accumulate in the pulper 1. In other words, discharge of the oversized materials can be effected periodically during the pulping operation without discontinuing pulping so that a constant and continuous output of pulped paper is attained with all of the advantages that such operation affords.

Figure 4:
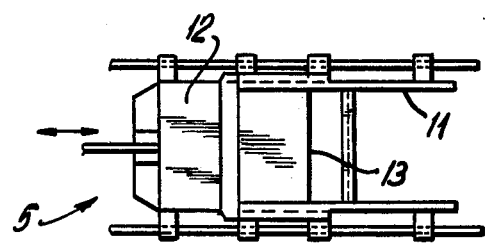
FIGS. 4 and 5 provide a side view, and plan view respectively, of a preferred flow control valve utilized in the plant embodying the present invention.
Figure 3:
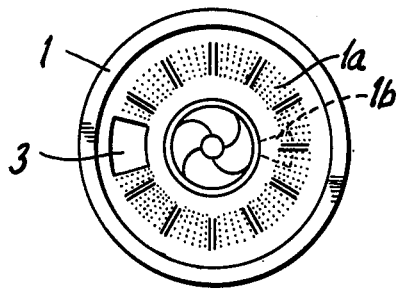
FIG. 3 is a top view of the kneader shown in FIG. 2.
Figure 5:
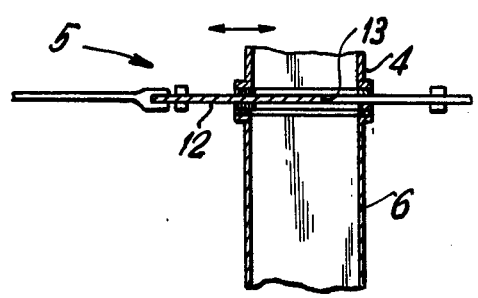

Another feature of the invention is the use of the sash lock-gate valve 5 which can shear any material passing through the pipe 4 for assuring proper closure of the outlet from the pulper 1. As shown in FIGS. 4 and 5, the valve 5 includes a blade 12 having a cutting edge 13 with the cutting edge co-acting with the remaining structure of the valve so that any materials located at the entrance into the pipe 6 can be sheared off assuring that the valve is completely closed. As can be seen in the drawing, the blade 12 is guided in a frame for closing the valve. Accordingly, the pulper can continue to operate without any leakage through the opening 3.

Preferably, the screen or grate 7a in the separator 7 is rotatable and jets of water 14 can be provided in the separator for washing the oversized foreign material. In such an arrangement, as the oversized material passes from one end of the separator 7 to the other any of the paper fibers attached to it are removed by the water jets assuring a particularly high recovery of the paper pulp within the separator 7.

It will be apparent to a person skilled in the art that the present invention affords the processing of paper-pulp in conformity with the normal requirements for paper mills, and, at the same time, affords a quick and continuous processing of the paper recovered from solid urban waste.

While specific embodiments of the invention have been shown and described in detail to illustrate the application of the inventive principles, it will be understood that the invention may be embodied otherwise without departing from such principles.

What is claimed is:

1. Plant for the continuous production of paper-pulp from paper recovered from solid urban waste comprising a hydrodynamic kneader for converting paper into paper-pulp, a sorting apparatus arranged to receive paper-pulp and other materials from said hydrodynamic kneader for separating the paper-pulp and other materials, said kneader having a first opening in the lower portion thereof, a grate covering said first opening and being sized to permit the passage therethrough of paper-pulp fibers to said first opening, said kneader having a second opening extending through said grate spaced from said first opening and being open in the surface of the grate to the space contiguous to said grate within said kneader, a pump located exteriorly of said kneader, a first pipeline connecting the first opening to said pump, a second pipeline connecting the second opening to said sorting apparatus, means for collecting the paper-pulp and other materials from said sorting apparatus, said grate in said kneader being arranged for the passage therethrough of paper-pulp and other materials having a size equal to or smaller than the paper-pulp and for retaining materials of a larger size incapable of passing therethrough, said first pipeline connected to said pump for withdrawing a flow of paper-pulp and other materials of a size sufficiently small to pass through said grate from said kneader, a selectively operable valve positioned in said second pipeline for periodically withdrawing paper-pulp and materials incapable of passing through said grate from said kneader and conveying the paper-pulp and materials to said sorting apparatus, said valve including a frame and a blade-like member having a knife-like cutting edge, said blade-like member rectilinearly movably displaceable within said frame transversely across the path of flow in said second pipeline between an open position and a closed position with said cutting edge leading as said blade-like member is moved into the closed position for effecting a cutting action on the material flowing therethrough and for closing off the flow through said second pipeline, said sorting apparatus including a separator having a first end and a second end with said first end connected to said second pipeline, a screen within said separator sized to pass paper-pulp therethrough separated from the material received through said second pipeline, a channel positioned at the second end of said separator to receive oversized material passing through said separator from which the paper-pulp has been separated, and a collector arranged to receive the paper-pulp after its passage through said screen and out of said separator from which it can be removed for subsequent treatment and use.

2. Plant for the continuous production of paper-pulp, as set forth in claim 1, wherein said screen is rotatable at about an axis extending through said first and second ends of said separator, and water jets within said separator for washing the oversized material passing therethrough.

* * * * *